US012667082B2

(12) United States Patent
Huang et al.

(10) Patent No.: US 12,667,082 B2
(45) Date of Patent: Jun. 30, 2026

(54) HAIR COMBING DEVICE

(71) Applicant: DO-IT INNOVATIONS TECHNOLOGY CO., LTD., Zhuhai (CN)

(72) Inventors: Jiacheng Huang, Zhuhai (CN); Xiaoling Chen, Zhuhai (CN); Shaochun Tian, Zhuhai (CN)

(73) Assignee: DO-IT INNOVATIONS TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 18/937,223

(22) Filed: Dec. 5, 2024

(65) Prior Publication Data

US 2026/0114423 A1 Apr. 30, 2026

(30) Foreign Application Priority Data

Oct. 24, 2024 (CN) .......................... 202422583715.6

(51) Int. Cl.
A01K 13/00 (2006.01)
A45D 24/14 (2006.01)
A45D 24/32 (2006.01)

(52) U.S. Cl.
CPC ............ A01K 13/002 (2013.01); A45D 24/14 (2013.01); A45D 24/32 (2013.01)

(58) Field of Classification Search
CPC ....... A01K 13/002; A45D 24/14; A45D 24/32
See application file for complete search history.

(56) References Cited

U.S. PATENT DOCUMENTS

| | | | | |
|---|---|---|---|---|
| 6,427,633 B1 * | 8/2002 | Ogden | ................. | A01K 13/002 |
| | | | | 119/600 |
| 8,960,129 B2 * | 2/2015 | Porter | ................. | A01K 13/002 |
| | | | | 119/632 |
| 2011/0030620 A1 * | 2/2011 | Jouan | ................... | A01K 13/002 |
| | | | | 119/611 |
| 2013/0145992 A1 * | 6/2013 | Liang | ........................ | A47L 7/02 |
| | | | | 119/608 |
| 2017/0295753 A1 * | 10/2017 | Cathaud | ................. | A46B 7/023 |
| 2018/0132452 A1 * | 5/2018 | Dionne | .................. | A46B 9/023 |
| 2024/0276952 A1 * | 8/2024 | van Eyk | .............. | A46B 5/0012 |
| 2024/0334904 A1 * | 10/2024 | Zeng | .................. | A46B 15/0053 |

FOREIGN PATENT DOCUMENTS

WO      WO-2018224992 A1 * 12/2018   .......... A01K 13/002

\* cited by examiner

*Primary Examiner* — Kimberly S Berona
*Assistant Examiner* — Katherine June Walter

(57) ABSTRACT

A hair combing device includes a brush main body. The brush main body includes a front scraping plate, a rear scraping plate and a row comb. A mounting cavity is defined in the brush main body. A first opening is in communication with the mounting cavity. The row comb is partially positioned in the mounting cavity. The front scraping plate and the rear scraping plate are arranged above a front surface of the row comb and below a back surface of the row comb respectively. The row comb moves telescopically along a length extension direction of the front scraping plate and the rear scraping plate under the action of external force, thereby simultaneously pushing the hair from different directions, allowing a hair to be smoothly pushed out from a comb tooth gap towards a top end of comb tooth. This structure can effectively improve the efficiency of hair combing.

19 Claims, 15 Drawing Sheets

HAIR COMBING DEVICE

CROSS-REFERENCE TO RELATED APPLICATIONS

The application claims priority of Chinese patent application 2024225837156, filed on Oct. 24, 2024, which is incorporated herein by reference in its entireties.

TECHNICAL FIELD

The present invention relates to the field of pets, particularly to a hair combing device.

BACKGROUND ART

As an important tool for pet cleaning and care, hair combing devices are widely used in daily care processes such as removing pet hair, combing hair knots, etc. A traditional hair combing device typically includes a fixed brush head and a handle, and the brush head is provided with comb teeth or brushes for combing pet hair.

An existing pet comb usually includes a handle, a scraping plate, a comb blade, etc. When in use, the scraping plate is pressed to move relative to the comb, achieving an effect that the pet hair stuck on the comb is squeezed to fall off. The fallen hair is sucked away through an air vent on the scraping plate, thereby keeping the comb clean. However, there are some shortcomings in the use of this structure. Since only the scraping plate on one side applies a pushing force to the hair, the hair is subject to uneven force easily during the pushing process, resulting in hair tilting or some hair remaining on the comb teeth, leading to poor cleaning effect. At the same time, the design of the scraping plate on a single side is also inconvenient in practical operation, and repeated combing by users is often needed to achieve a desired cleaning effect, which is time-consuming and laborious.

Therefore, there is an urgent need for a hair combing device product that can effectively solve the problem of hair entanglement, improve hair removal efficiency, and automatically collect hair, so as to improve usage efficiency and user experience.

SUMMARY

In order to solve the problem of hair entanglement in existing hair combing devices and improve the efficiency of hair removal, the present invention aims to overcome the shortcoming of hair being subject to force on a single side in existing pet combs. By designing a structure that a front scraping plate and a rear scraping plate are used in conjunction with a row comb, the hair during a combing process can be evenly pushed, and efficient cleaning of the hair can be achieved through driving of a transmission component. At the same time, an effect of the hair falling off from comb teeth is improved, achieving more ideal beauty and cleaning purposes.

The technical solution adopted by the present invention to solve its technical problem is as follows.

A hair combing device includes a brush main body. The brush main body includes a front scraping plate, a rear scraping plate and a row comb. A mounting cavity is defined in the brush main body. The brush main body is provided with a first opening, and the first opening is in communication with the mounting cavity. The row comb is arranged at the first opening and at least partially positioned in the mounting cavity. The front scraping plate and the rear scraping plate are arranged on a front surface of the row comb and a back surface of the row comb respectively. Moreover, under the action of external force, the row comb is movable relative to the front scraping plate and the rear scraping plate, and telescopic towards an inside of the mounting cavity, so that the front scraping plate and the rear scraping plate can simultaneously push a hair on the row comb from a comb tooth gap of the row comb to a top end of comb tooth of the row comb for removal.

As an improvement of the present invention, the brush main body further includes a transmission component. The transmission component is arranged in the mounting cavity. The row comb is connected to the transmission component, and the row comb is capable of being driven to move relative to the front scraping plate and the rear scraping plate by driving the transmission component.

As an improvement of the present invention, a second opening is defined in a side wall of the brush main body. The second opening is in communication with the mounting cavity. The transmission component includes one force driven end and a connecting end. The connecting end of the transmission component is connected to the row comb. The force driven end of the transmission component is arranged at the second opening. When an external force acts on the force driven end of the transmission component, the transmission component is configured for driving the row comb to move relative to the front scraping plate and the rear scraping plate.

As an improvement of the present invention, the transmission component further includes restoration springs and a connecting member. The connecting member is partially installed on the rear scraping plate. A first end of the connecting member is the connecting end, and a second end of the connecting member is the force driven end. The rear scraping plate is provided with stop parts. One end of the restoration spring abuts against the stop part, and an opposite end of the restoration spring abuts against the connecting member. When the force driven end is driven by external force, the connecting member is approached toward the stop part. The restoration spring is used for restoring the connecting member to an initial position.

As an improvement of the present invention, the connecting member includes a first connecting member, a second connecting member and a pressing member. A first end of the second connecting member is the connecting end. The force driven end is arranged on the pressing member. One end of the first connecting member is connected to a second end of the second connecting member. The pressing member is connected to an opposite end of the first connecting member. The pressing member is positioned at the second opening. When the force driven end on the pressing member is pressed, the first connecting member drives the second connecting member, so that the second connecting member drives the row comb to move. The restoration spring is used for restoring the first connecting member, the second connecting member and the row comb to the initial position.

As an improvement of the present invention, the first connecting member is hinged with the second connecting member.

As an improvement of the present invention, the second connecting member is provided with protrusions. One end of the restoration spring is connected to the stop part, and an opposite end of the restoration spring is sleeved on the protrusion.

As an improvement of the present invention, a side edge of the second connecting member near the first connecting member is also provided with a fixing frame. The fixing frame is arranged on the side edge of the second connecting member and is hinged with the first connecting member. The stop part, the restoration spring and the protrusion are positioned in the fixing frame. The stop part is arranged near the first connecting member.

As an improvement of the present invention, the fixing frame includes a first fixing frame and a second fixing frame. The first fixing frame and the second fixing frame are both arranged on the side edge of the second connecting member. The first connecting member is arranged between the first fixing frame and the second fixing frame. Both the first fixing frame and the second fixing frame are hinged with the first connecting member. The first fixing frame and the second fixing frame are both internally provided with the stop part, the restoration spring and the protrusion.

As an improvement of the present invention, a root portion of comb tooth of the row comb is always positioned in the mounting cavity.

As an improvement of the present invention, the brush main body further includes a handle and a scraping head. The mounting cavity includes a first mounting cavity and a second mounting cavity. The scraping head is arranged at one end of the handle. The first opening is defined in the scraping head. The first mounting cavity is defined in the scraping head. The second mounting cavity is defined in the handle. The first mounting cavity is in communication with the second mounting cavity, and the first mounting cavity is in communication with the first opening. The second mounting cavity is in communication with the second opening. A first part of the transmission component is arranged in the first mounting cavity, and a second part of the transmission component is arranged in the second mounting cavity. The second opening is defined in a side wall of the handle.

As an improvement of the present invention, the scraping head includes an upper cover and a lower cover. The lower cover is connected to the handle. The upper cover and the lower cover are capable of being closed to each other. After the upper cover and the lower cover are closed, the first mounting cavity and the first opening are formed. The upper cover is the front scraping plate. The lower cover is the rear scraping plate.

As an improvement of the present invention, the brush main body further includes a mounting plate. The mounting plate is arranged in the first mounting cavity and mounted on the lower cover. The mounting plate divides the first mounting cavity into a first mounting sub-cavity and a ventilation channel, and divides the first opening into a first sub-opening and an air inlet. The first mounting sub-cavity and the ventilation channel are both in communication with the second mounting cavity. The transmission component is partially arranged in the first mounting sub-cavity. The handle is provided with an insertion hole for connecting with a suction port of a dust suction device. The insertion hole is in communication with the second mounting cavity. The upper cover is the front scraping plate, and the mounting plate is the rear scraping plate.

As an improvement of the present invention, the scraping head is arranged at one end of the handle to form an L-shape.

As an improvement of the present invention, the insertion hole is arranged at a tail end of the handle.

As an improvement of the present invention, the upper cover includes a flat surface, a curved surface extending towards the first opening, and a blocking plate. One end of the curved surface is connected to the flat surface, an opposite end of the curved surface is connected to one end of the blocking plate, and an opposite end of the blocking plate is close to the row comb.

As an improvement of the present invention, two side walls of the upper cover are further provided with clamping blocks. The lower cover is provided with clamping slots corresponding to the clamping blocks. The clamping block is inserted into and clamped to the clamping slot.

As an improvement of the present invention, both the upper cover and the lower cover are also provided with threaded holes. The upper cover is threaded to the lower cover through the threaded holes.

As an improvement of the present invention, the force driven end of the pressing member is arranged protruding from the second opening.

As an improvement of the present invention, the row comb is parallel to the front scraping plate and the rear scraping plate. The front scraping plate includes a first scraping surface. The rear scraping plate includes a second scraping surface. The row comb includes the top end of comb tooth. A distance between the first scraping surface of the front scraping plate and the top end of comb tooth of the row comb is a first distance. A distance between the second scraping surface of the rear scraping plate and the top end of comb tooth of the row comb is a second distance. The second distance is greater than the first distance.

Beneficial effects of the present invention are as follows. Through the coordinated design of the front scraping plate, the rear scraping plate, and the row comb in the brush main body, efficient pet hair combing and cleaning have been achieved. The front scraping plate and the rear scraping plate are respectively arranged on the front surface and the back surface of the row comb. When the row comb is moved by external force, the front scraping plate and the rear scraping plate can simultaneously move the hair on the row comb from different directions. The design of scraping plates arranged on both sides is more efficient than traditional design of hair being combed by one side, and can effectively solve the problems of hair being pushed unevenly and cleaned incompletely caused by hair being subject to force on a single side. The comb, through the synergistic effect with the front scraping plate and the rear scraping plate, ensures that hair can be smoothly pushed from the comb tooth gap to the top end of comb tooth, significantly improving cleaning efficiency. The overall structure is simple and stable, suitable for hair treatment of different lengths and types, with the advantages of easy operation, thorough cleaning, and high durability.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
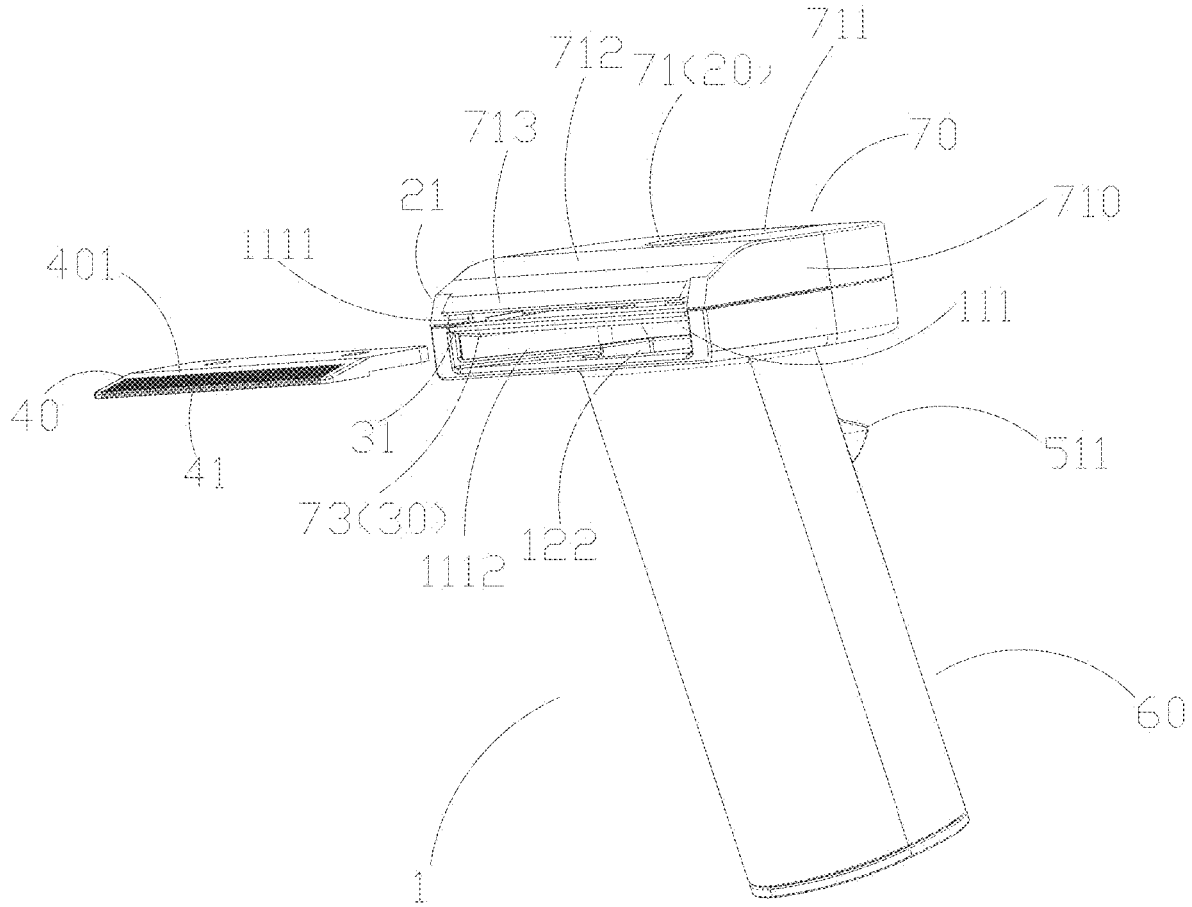
FIG. 1 is a schematic diagram of an overall structure of a hair combing device of the present invention from an angle of view.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIG. 1 to FIG. 15, a hair combing device includes a brush main body 1. The brush main body 1 includes a front scraping plate 20, a rear scraping plate 30 and a row comb 40. A mounting cavity 12 is defined in the brush main body 1. The brush main body 1 is provided with a first opening 111, and the first opening 111 is in communication with the mounting cavity 12. The row comb 40 is arranged at the first opening 111 and at least partially positioned in the mounting cavity 12. The front scraping plate 20 and the rear scraping plate 30 are arranged on a front surface 401 of the row comb 40 and a back surface 402 of the row comb 40 respectively. Moreover, under the action of external force, the row comb 40 is movable relative to the front scraping plate 20 and the rear scraping plate 30, and is telescopic towards an inside of the mounting cavity, so that the front scraping plate 20 and the rear scraping plate 30 can simultaneously push a hair on the row comb 40 from a comb tooth gap of the row comb 40 to a top end of comb tooth of the row comb 40 for removal.

Through the arrangement of the above structure, the front scraping plate 20 and the rear scraping plate 30 of the brush main body 1 can be arranged above the front surface and below the back surface of the row comb 40 respectively, which ensures that the hair is combed evenly on the row comb 40. The row comb 40 can move telescopically relative to the scraping plates under the action of external force, so that the hair is removed from the comb tooth gap of the row comb 40 to the top end of comb tooth of the row comb 40, so as to achieve fast and effective hair removal. The design makes the hair will not get stuck in the comb tooth gap of the row comb 40, especially suitable for handling long hair, which can reduce the situation of hair entanglement.

Figure 5:
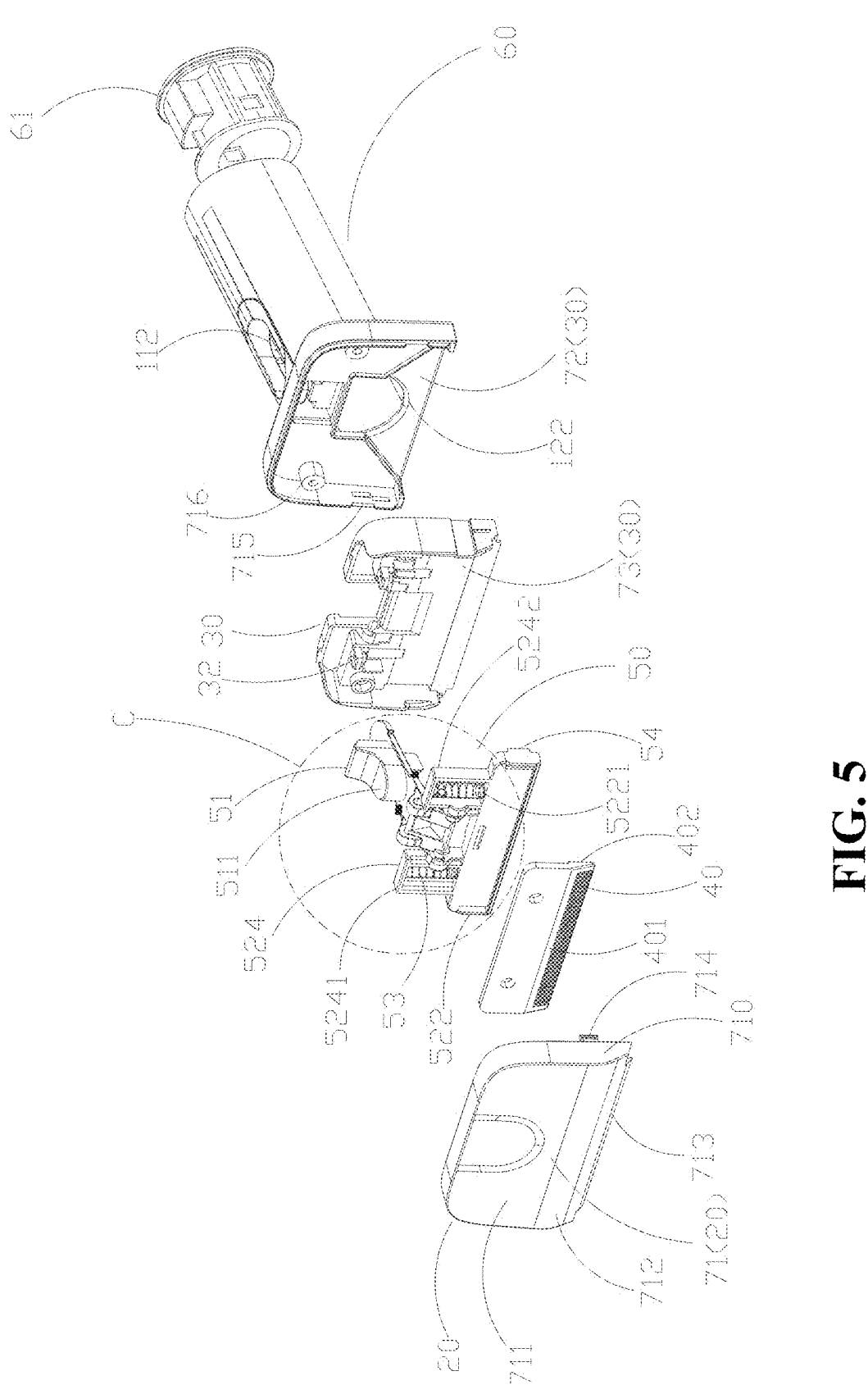
FIG. 5 is a schematic diagram of an exploded structure of a hair combing device of the present invention.

In this embodiment, as shown in FIG. 5, the brush main body 1 further includes a transmission component 50. The transmission component 50 is arranged in the mounting cavity 12. The row comb 40 is connected to the transmission component 50. The row comb 40 is capable of being driven to move relative to the front scraping plate 20 and the rear scraping plate 30 by driving the transmission component 50. Through the configuration of the above structure, the transmission component 50 is connected to the row comb 40, so that the row comb 40 can automatically complete the telescopic movement between the front scraping plate 20 and the rear scraping plate 30, further improving the efficiency of hair combing. The driving of the transmission component 50 eliminates the inconvenience of manual operation and reduces fatigue of a user, which can significantly improve the user experience especially when combing for a long time or combing heavy hair.

In this embodiment, as shown in FIG. 5, a second opening 112 is defined in a side wall of the brush main body 1. The second opening 112 is in communication with the mounting cavity 12. The transmission component 50 includes one force driven end 51 and a connecting end 54. The connecting end 54 of the transmission component is connected to the row comb 40. The force driven end 51 of the transmission component 50 is arranged at the second opening 112. When an external force acts on the force driven end 51 of the transmission component 50, the transmission component 50 is configured for driving the row comb 40 to move relative to the front scraping plate 20 and the rear scraping plate 30. Through the configuration of the above structure, the force driven end 51 of the transmission component 50 is arranged at the second opening 112, so that the user can easily control the telescopic movement of the row comb 40 by applying external force. This design improves the ease of operation, making hair cleaning easier and more efficient. The force driven end 51 of the transmission component 50 can ensure that the moving process of the row comb 40 is more stable and reduce the situation of hair stuck, which is particularly effective when dealing with heavy hair.

In this embodiment, as shown in FIG. 5, the transmission component 50 further includes restoration springs 53 and a connecting member 52. The connecting member 52 is partially installed on the rear scraping plate 30. A first end of the connecting member 52 is the connecting end 54, and a second end of the connecting member 52 is the force driven end 51. The rear scraping plate 30 is provided with stop parts 32. One end of the restoration spring 53 abuts against the stop part 32, and an opposite end of the restoration spring 53 abuts against the connecting member 52. When the force driven end 51 is driven by external force, the connecting member 52 is approached toward the stop part 32. The restoration spring 53 is used for restoring the connecting member 52 to an initial position. Through the configuration of the above structure, the design of the restoration spring 53 and the connecting member 52 ensures that the row comb 40 can be automatically restored after the driving of external force, avoiding the trouble of manual adjustment by the user. The presence of the restoration spring 53 effectively improves the continuity of the work of the row comb 40 and the transmission component 50, reduces the error caused by repeated operations, and can maintain smooth operation during use, further improving the efficiency of combing.

Figure 6:
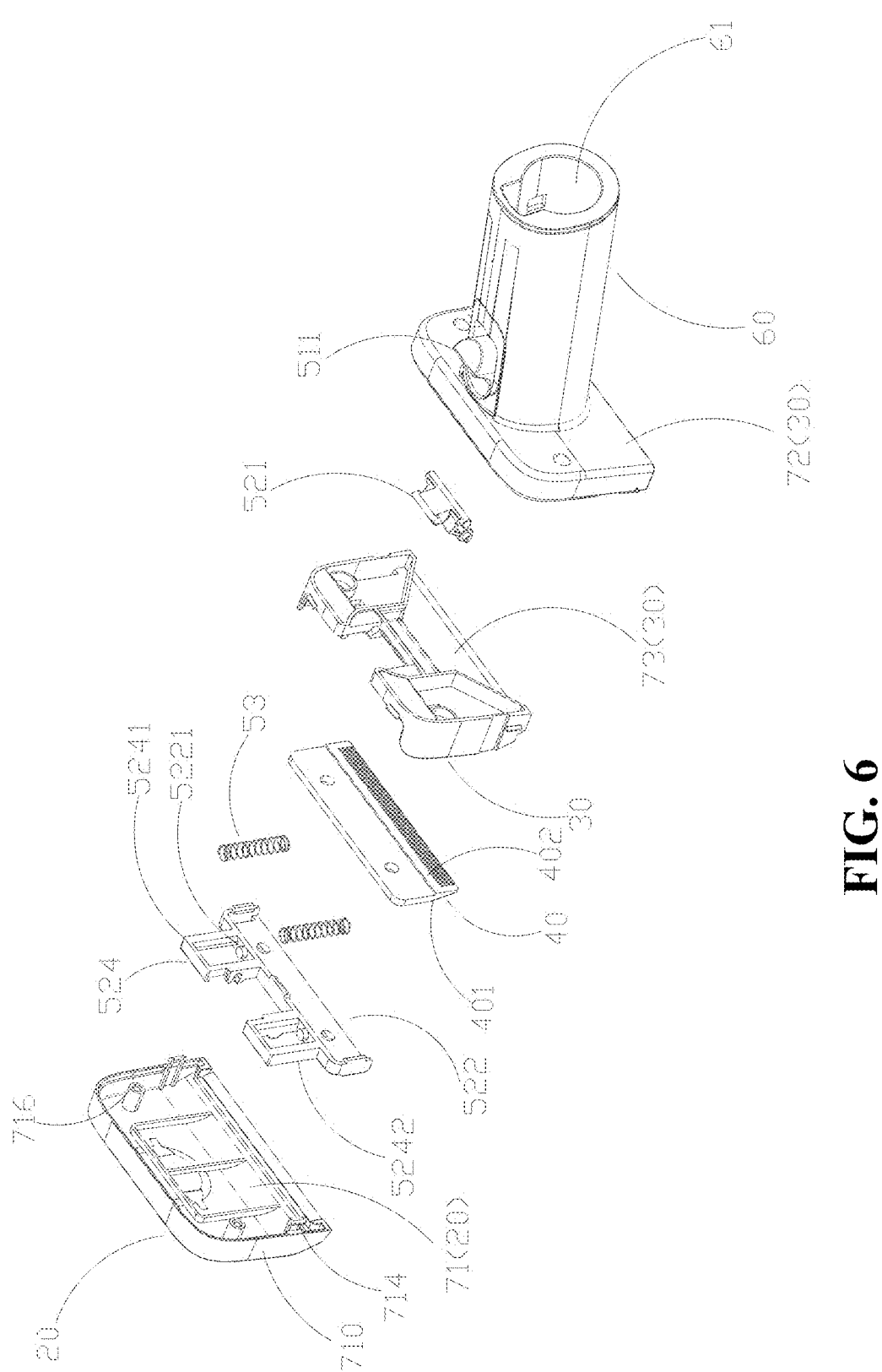
FIG. 6 is a schematic diagram of an exploded structure of a hair combing device of the present invention from another angle of view.

In this embodiment, as shown in FIGS. 5-6, the connecting member 52 includes a first connecting member 521, a second connecting member 522 and a pressing member 511. A first end of the second connecting member 522 is the connecting end 54. The force driven end 51 is arranged on the pressing member 511. One end of the first connecting member 521 is connected to a second end of the second connecting member 522. The pressing member 511 is connected to an opposite end of the first connecting member 521. The pressing member 511 is positioned at the second opening 112. When the force driven end 51 on the pressing member 511 is pressed, the first connecting member 521 drives the second connecting member 522, so that the second connecting member 522 drives the row comb 40 to move. The restoration spring 53 is used for restoring the first connecting member 521, the second connecting member 522 and the row comb 40 to the initial position. Through the configuration of the above structure, the force driven end 51 of the pressing member 511 can allow the user to directly control the operation of the transmission component 50 through the pressing action, and the operation is simple and intuitive. The coordinated design with the restoration spring 53 can ensure that after the operation, the row comb 40 can be restored to the initial position in time, which improves the convenience and continuity of the use of the hair combing device, is especially suitable for scenes of frequent use, and avoids the trouble caused by complex operations.

Figure 9:
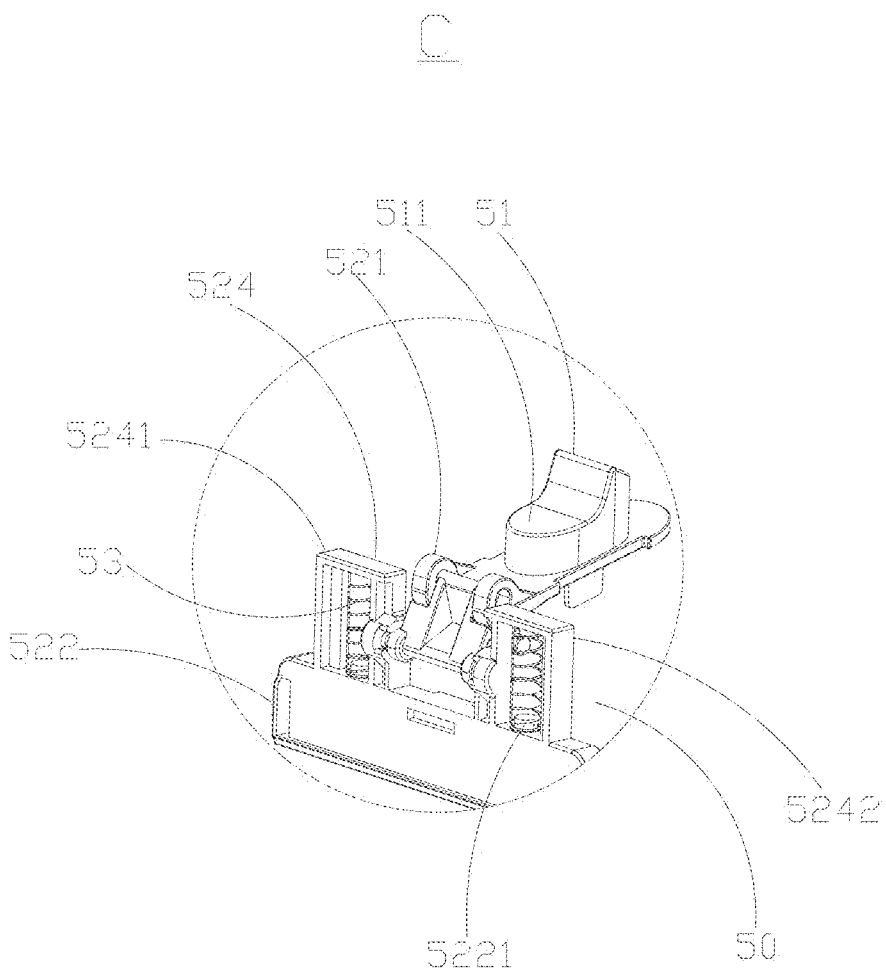
FIG. 9 is an enlarged view of area C of FIG. 5.

In this embodiment, as shown in FIG. 9, the first connecting member 521 is hinged with the second connecting member 522. Through the configuration of the above structure, the hinged connection of the first connecting member 521 and the second connecting member 522 enhances the structural flexibility of the transmission component 50, so that the row comb 40 can move more smoothly and flexibly during operation. At the same time, the design also ensures the durability of the transmission component during use, extending the service life of the hair combing device.

Figure 7:
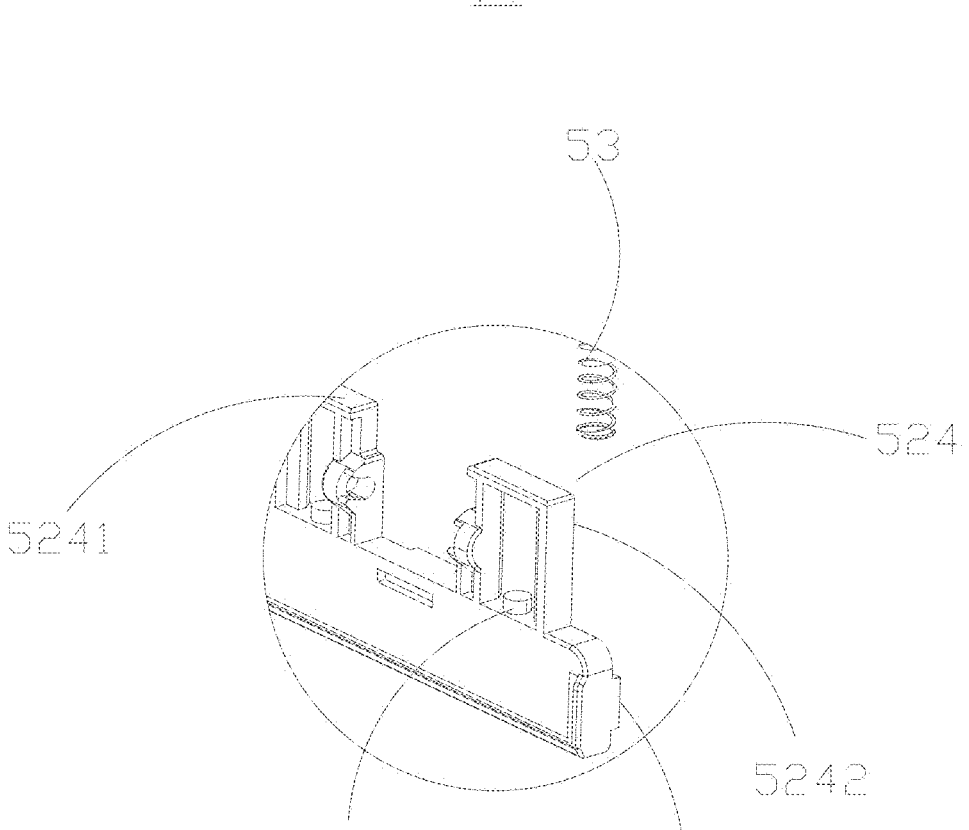
FIG. 7 is an enlarged view of area A of FIG. 4.

In this embodiment, as shown in FIG. 7, the second connecting member 522 is provided with protrusions 5221. One end of the restoration spring 53 is connected to the stop part 32, and an opposite end of the restoration spring 53 is sleeved on the protrusion 5221. Through the arrangement of the above structure, the design of the protrusion 5221 on the second connecting member 522 enables the restoration spring 53 to be firmly combined with the connecting member. This structure not only enhances the stability of the restoration spring 53, but also further improves the precision of restoration of the row comb 40. The row comb 40 operates more smoothly during the restoration process, reducing the possible problem of getting stuck and ensuring the fluency of the combing process.

Figure 8:
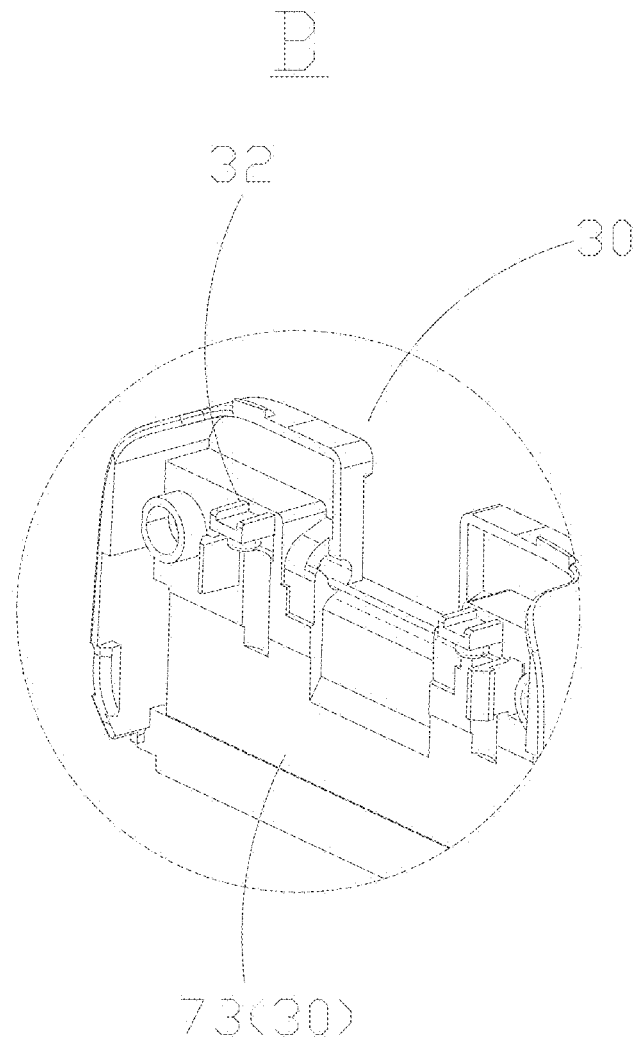
FIG. 8 is an enlarged view of area B of FIG. 4.

In this embodiment, as shown in FIGS. 7-8, a side edge of the second connecting member 522 near the first connecting member 521 is also provided with a fixing frame 524. The fixing frame 524 is arranged on the side edge of the second connecting member 522 and is hinged with the first connecting member 521. The stop part 32, the restoration spring 53 and the protrusion 5221 are positioned in the fixing frame 524. The stop part 32 is arranged near the first connecting member 521. Through the configuration of the above structure, the fixing frame 524 effectively supports the structure of the connecting member 52 and provides additional stability. The restoration spring 53, the stop part 32 and the protrusion 5221 are all included in the fixing frame 524, which makes the operation of the whole transmission component 50 more stable. The structural design improves the strength of the hair combing device in use, it can still maintain normal work to ensure the effect of hair combing especially when a large external force is applied.

In this embodiment, as shown in FIGS. 7-8, the fixing frame 524 includes a first fixing frame 5241 and a second fixing frame 5242. The first fixing frame 5241 and the second fixing frame 5242 are both arranged on the side edge of the second connecting member 522. The first connecting member 521 is arranged between the first fixing frame 5241 and the second fixing frame 5242, and both the first fixing frame 5241 and the second fixing frame 5242 are hinged with the first connecting member 521. The first fixing frame 524 and the second fixing frame 5242 are both internally provided with the stop part 32, the restoration spring 53 and the protrusion 5221. Through the configuration of the above structure, the first fixing frame 5241 and the second fixing frame 5242 are hinged with the first connecting member 521, so that the transmission component 50 is more stable during use, and the first connecting member 521 can be better supported in different directions.

Figure 10:
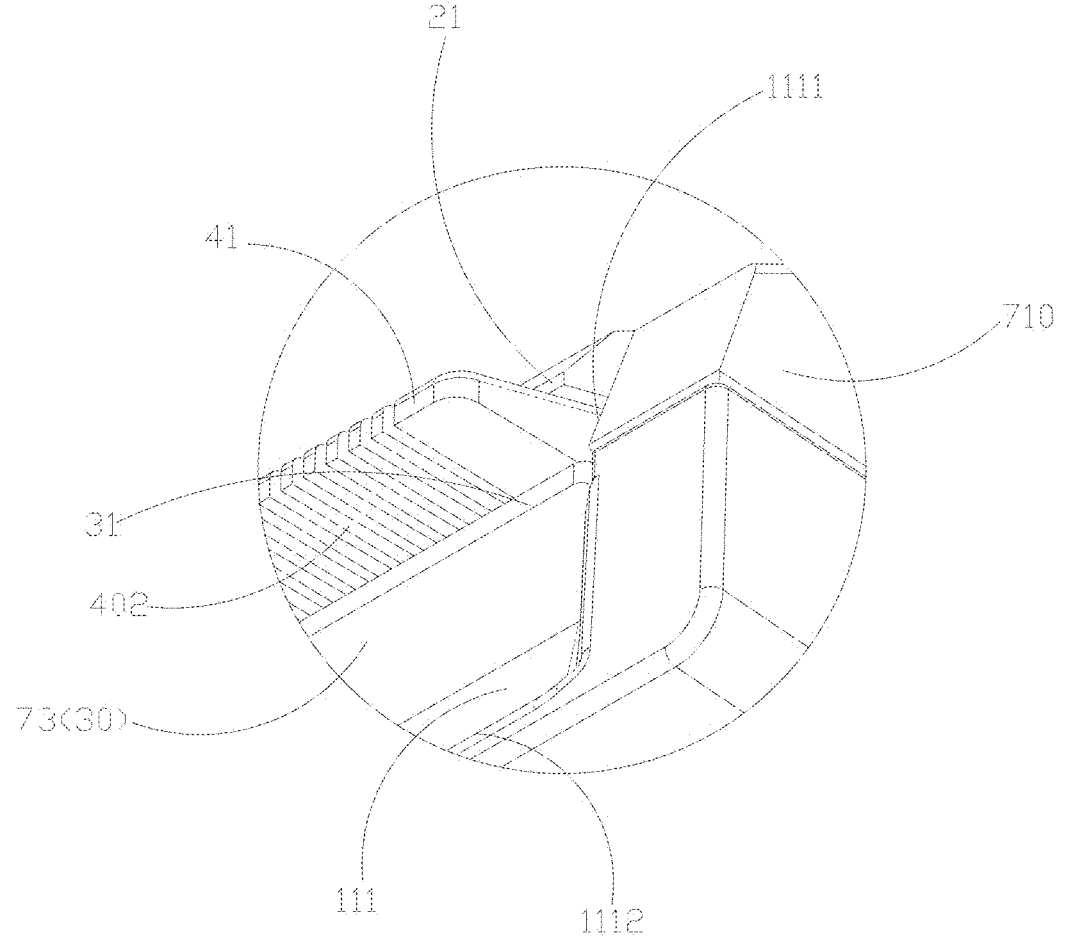
FIG. 10 is an enlarged view of area D of FIG. 2.
Figure 11:
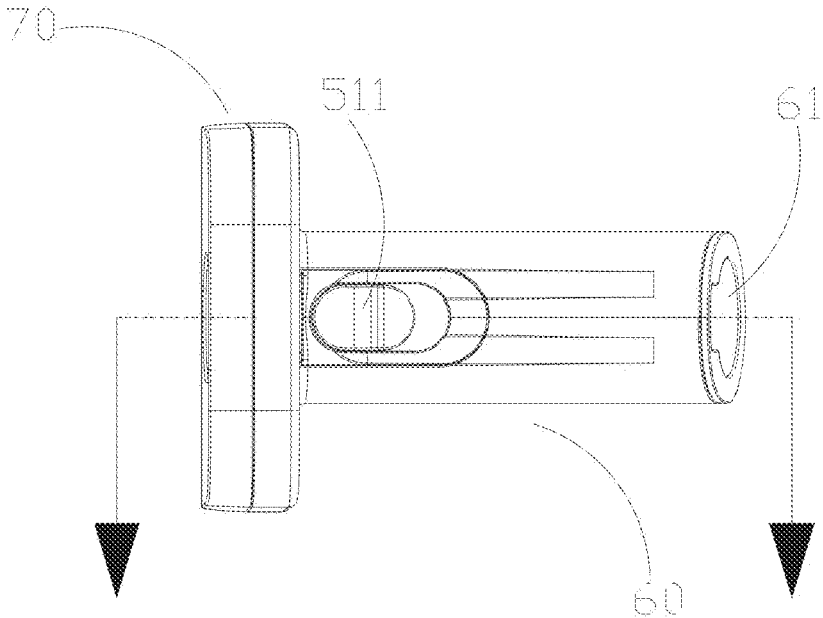
FIG. 11 is a top view of a hair combing device of the present invention.

In this embodiment, as shown in FIG. 10, a root portion of comb tooth of the row comb 40 is always positioned in the mounting cavity 12. Through the configuration of the above structure, by being always positioned in the mounting cavity 12, the root portion of comb tooth of the row comb 40 can be effectively protected from external factors, such as dust, hair accumulation or collision of external force, so as to keep the comb clean.

Figure 3:
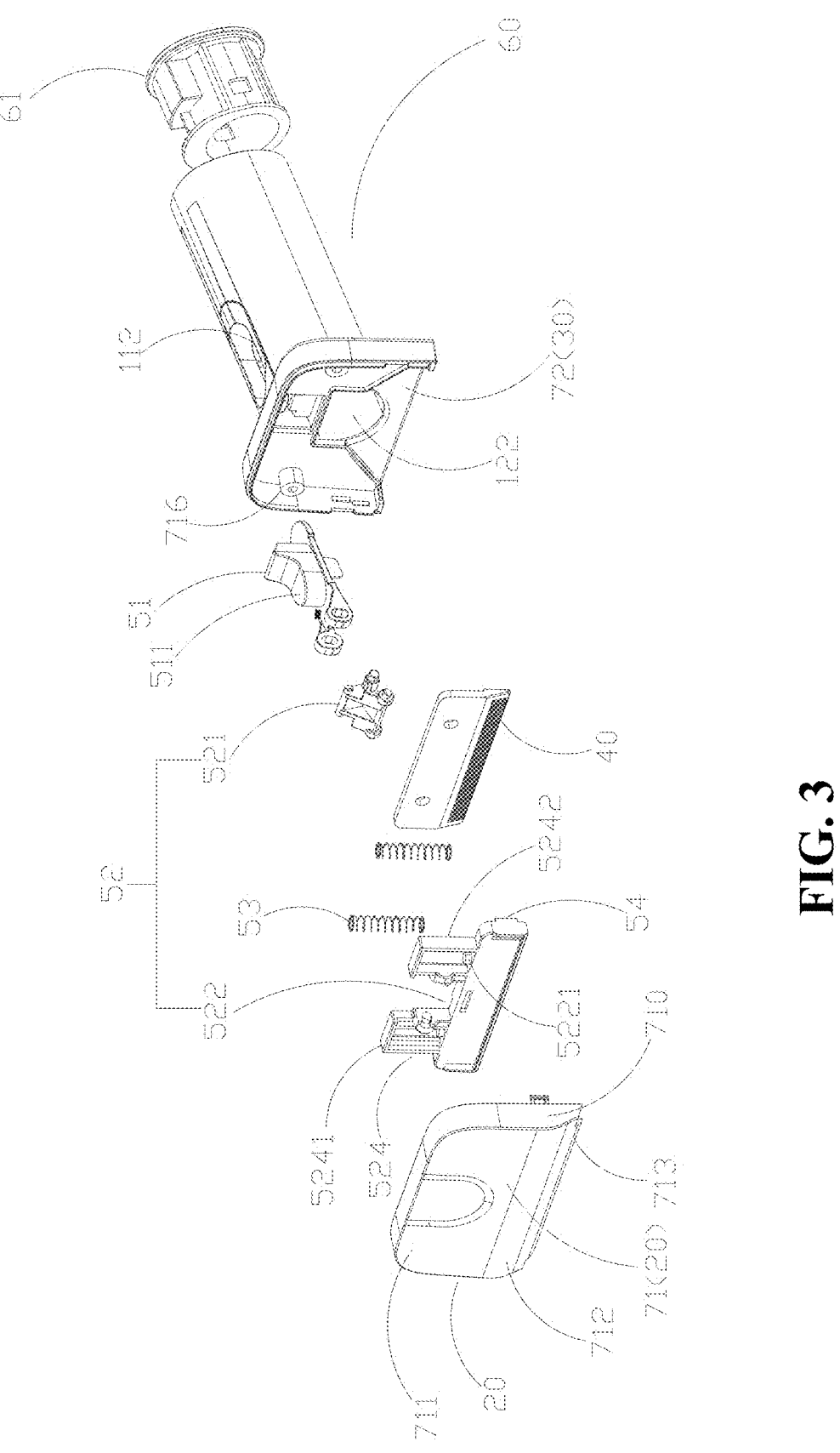
FIG. 3 is a schematic diagram of an exploded structure of a first embodiment of a hair combing device of the present invention.
Figure 4:
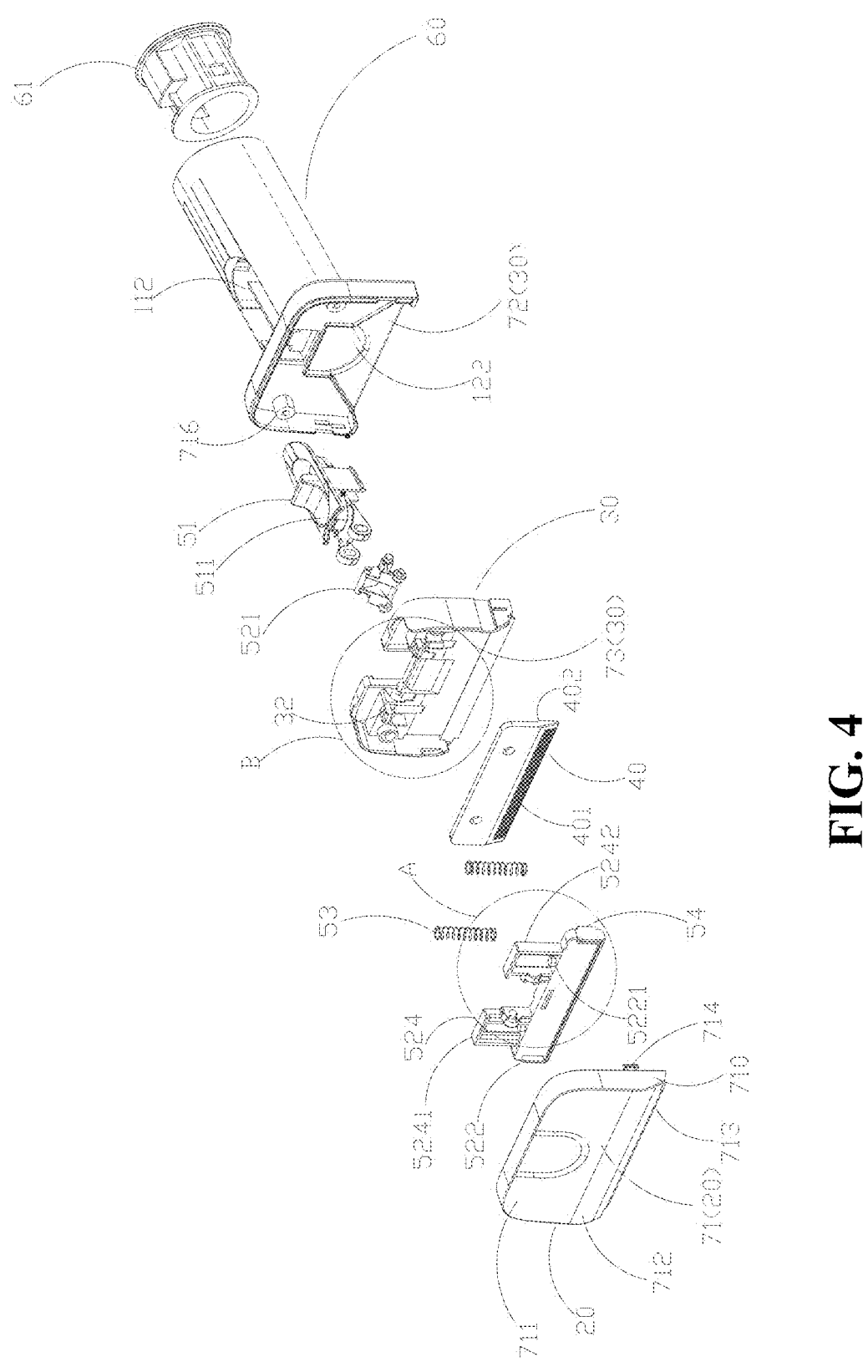
FIG. 4 is a schematic diagram of an exploded structure of a second embodiment of a hair combing device of the present invention.

In this embodiment, as shown in FIGS. 3-4, the brush main body 1 further includes a handle 60 and a scraping head 70. The mounting cavity 12 includes a first mounting cavity 121 and a second mounting cavity 122. The scraping head 70 is arranged at one end of the handle 60. The first opening 111 is defined in the scraping head 70. The first mounting cavity 121 is defined in the scraping head 70. The second mounting cavity 122 is defined in the handle 60. The first mounting cavity 121 is in communication with the second mounting cavity 122, and the first mounting cavity 121 is in communication with the first opening 111. The second mounting cavity 122 is in communication with the second opening 112. A first part of the transmission component 50 is arranged in the first mounting cavity 121, and a second part of the transmission component 50 is arranged in the second mounting cavity 122. The second opening 112 is defined in a side wall of the handle 60. Through the configuration of the above structure, the combination of the handle 60 and the scraping head 70 makes the hair combing device more convenient to operate. The communicated structure of the first mounting cavity 121 and the second mounting cavity 122 improves the layout rationality of the transmission component 50, makes the distribution of the transmission component 50 in different areas, reduces design problems caused by space limitations, and improves the use comfort and operation fluency of the device.

In this embodiment, as shown in FIG. 3, a first embodiment is provided. In the first embodiment, the scraping head 70 includes an upper cover 71 and a lower cover 72. The lower cover 72 is connected to the handle 60. The upper cover 71 and the lower cover 72 are capable of being closed to each other. After the upper cover 71 and the lower cover 72 are closed, the first mounting cavity 121 and the first opening 111 are formed. The upper cover 71 is the front scraping plate 20. The lower cover 72 is the rear scraping plate 30. Through the arrangement of the above structure, the upper cover 71 and the lower cover 72 cover each other to form the first mounting cavity 121, and the combing work is completed directly through the coordination of the front scraping plate 20 and the rear scraping plate 30 with the row comb 40, making the overall structure more compact and simple, making the installation simpler and simplifying the overall design.

Figure 15:
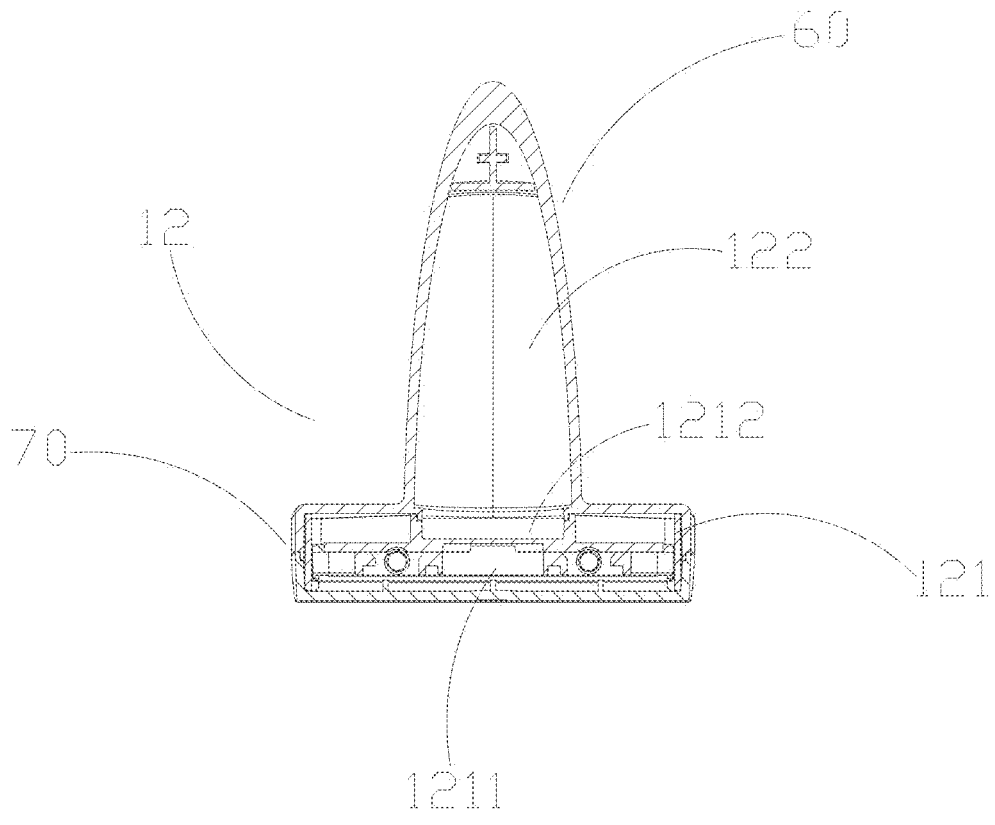
FIG. 15 is a cross-sectional view of FIG. 14.

In this embodiment, as shown in FIG. 4 and FIG. 15, a second embodiment is provided. In the second embodiment, the brush main body 1 further includes a mounting plate 73. The mounting plate 73 is arranged in the first mounting cavity 121 and mounted on the lower cover 72. The mounting plate 73 divides the first mounting cavity 121 into a first mounting sub-cavity 1211 and a ventilation channel 1212, and divides the first opening 111 into a first sub-opening 1111 and an air inlet 1112. The first mounting sub-cavity 1211 and the ventilation channel 1212 are both in communication with the second mounting cavity 122. The transmission component 50 is partially arranged in the first mounting sub-cavity 1211. The handle 60 is provided with an insertion hole 61 for connecting with a suction port of a dust suction device. The insertion hole 61 is in communication with the second mounting cavity 122. The upper cover 71 is the front scraping plate 20, and the mounting plate 73 is the rear scraping plate 30. Through the configuration of the above structure, the mounting plate 73 is arranged to separate the first mounting cavity 121 into the first mounting sub-cavity 1211 and the ventilation channel 1212, and separate the first opening 111 into the first sub-opening 1111 and the air inlet 1112. Moreover, the first mounting sub-cavity 1211 and the ventilation channel 1212 are both in communication with the second mounting cavity 122. The insertion hole 61 is in communication with the second mounting cavity 122, so that the insertion hole 61 on the handle 60 can be used for connecting with the suction port of the dust suction device. Through this design, the dust suction device can simultaneously clean the hair on the row comb 40 during the combing process, which improves the efficiency of hair cleaning, avoids hair falling and residue, and makes the combing process cleaner and more efficient.

In this embodiment, as shown in FIG. 1, the scraping head 70 is arranged at one end of the handle 60 to form an L-shape. Through the configuration of the above structure, the row comb 40 of the scraping head 70 is arranged at one end away from a connection between the handle 60 and the scraping head 70, and the force driven end 51 is on the handle 60, so that the L-shaped design between the handle 60 and the scraping head 70 is more ergonomic, convenient for the user to apply force, thereby increasing the user's comfort in the use process and reducing the fatigue of long-term operation.

Figure 2:
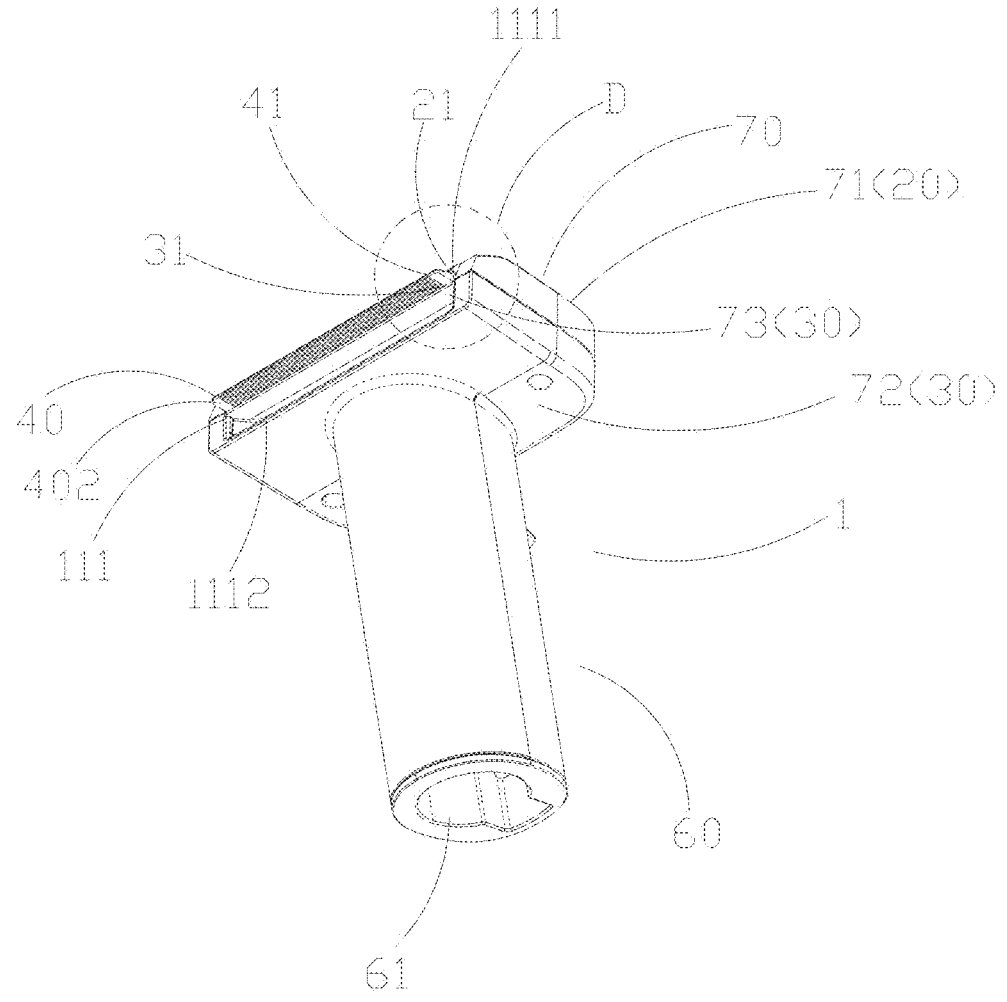
FIG. 2 is a schematic diagram of an overall structure of a hair combing device of the present invention from another angle of view.

In this embodiment, as shown in FIG. 2, the insertion hole 61 is arranged at a tail end of the handle 60. Through the configuration of the above structure, the scraping head 70 and the handle 60 are arranged in an L-shape, so that an angle between the handle 60 and the scraping head 70 is more ergonomic, increasing the comfort of the user during use and reducing the feeling of fatigue during long-term operation. Through the configuration of the above structure, the insertion hole 61 is defined in the tail end of the handle 60, so that the dust suction device can be directly connected to a back end of the handle 60, this design avoids interference to a normal holding area of the handle 60, and ensures the convenience of the user in the operation process.

Figure 14:
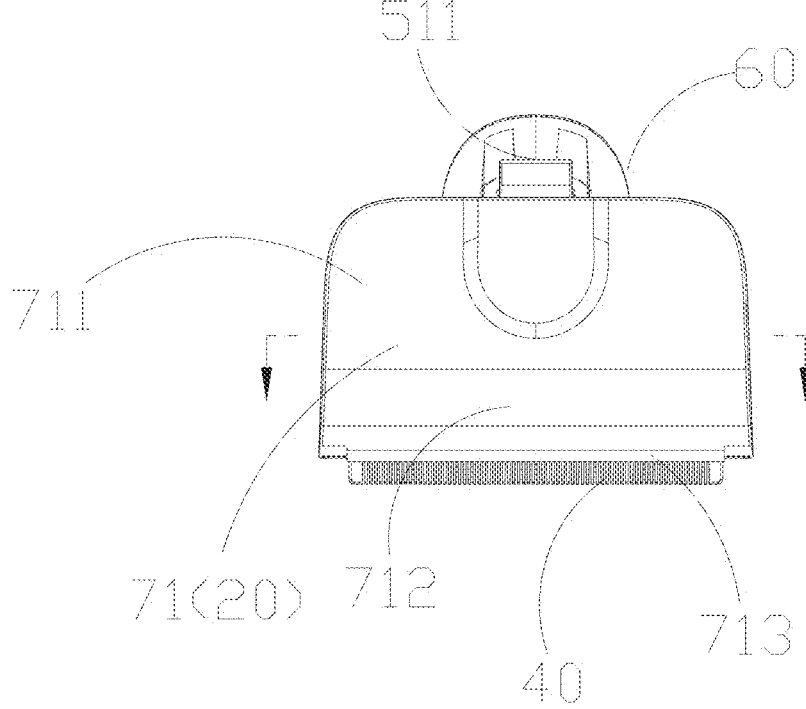
FIG. 14 is a front view of a hair combing device of the present invention.

In this embodiment, as shown in FIG. 14, the upper cover includes a flat surface 711, a curved surface 712 extending towards the first opening 111, and a blocking plate 713. One end of the curved surface 712 is connected to the flat surface 711, an opposite end of the curved surface 712 is connected to one end of the blocking plate 713, and an opposite end of the blocking plate 713 is close to the row comb 40. Through the configuration of the above structure, the design of the flat surface 711, the curved surface 712 and the blocking plate 713 on the upper cover can provide better air guidance and protection. The structure of the curved surface and the blocking plate help to avoid the accumulation of hair on the row comb 40, and can effectively prevent hair from scattering out of the row comb 40.

In this embodiment, as shown in FIG. 6, two side walls 710 of the upper cover 71 are further provided with clamping blocks 714. The lower cover 72 is provided with clamping slots 715 corresponding to the clamping blocks 714. The clamping block 714 is inserted into and clamped to the clamping slot 715. Through the configuration of the above structure, the coordinated design of the clamping block 714 and the clamping slot 715 makes the upper cover 71 and the lower cover 72 firmly connected together, and improves the structural strength and stability of the whole device.

In this embodiment, as shown in FIG. 5 and FIG. 6, both the upper cover 71 and the lower cover 72 are also provided with threaded holes 716. The upper cover 71 is threaded to the lower cover 72 through the threaded holes 716. Through the configuration of the above structure, the threaded connection ensures the stable fastening of the upper cover 71 and the lower cover 72, while also making disassembly and maintenance easy, improving the ease of use and durability of the hair combing device.

Figure 12:
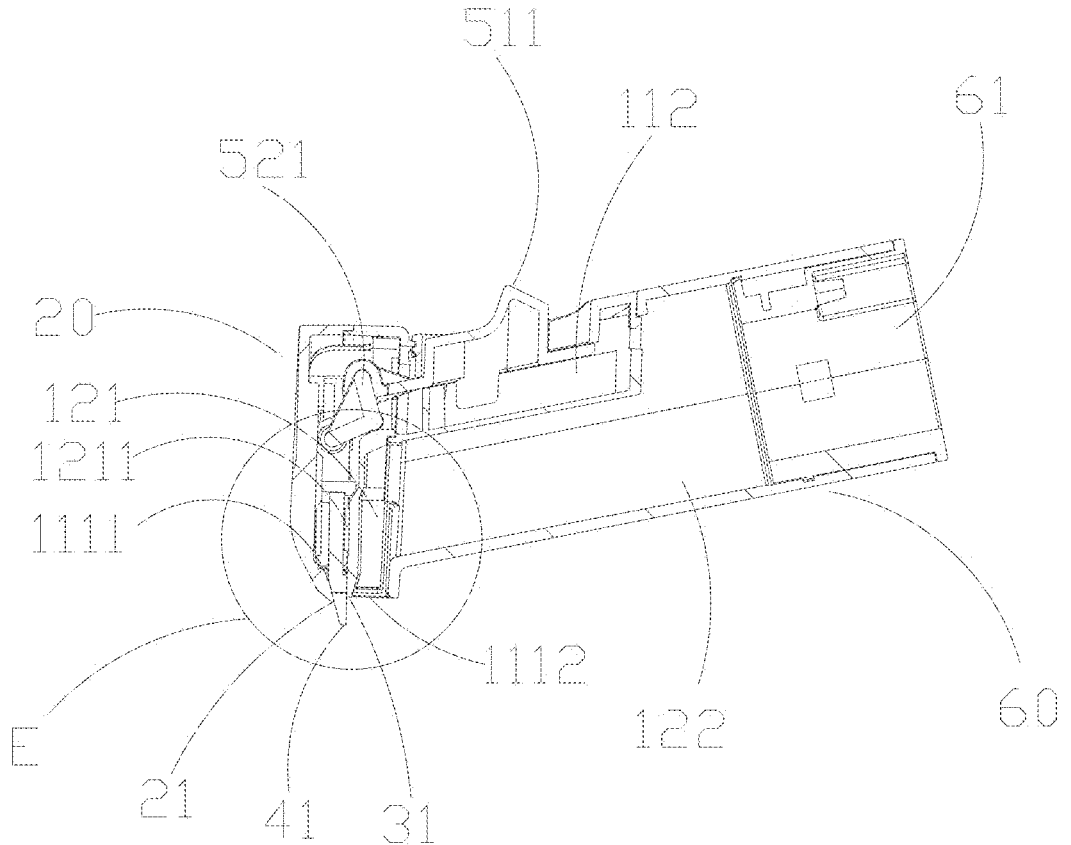
FIG. 12 is a cross-sectional view of FIG. 11.
Figure 13:
FIG. 13 is an enlarged view of area E of FIG. 12.
Figure 13:
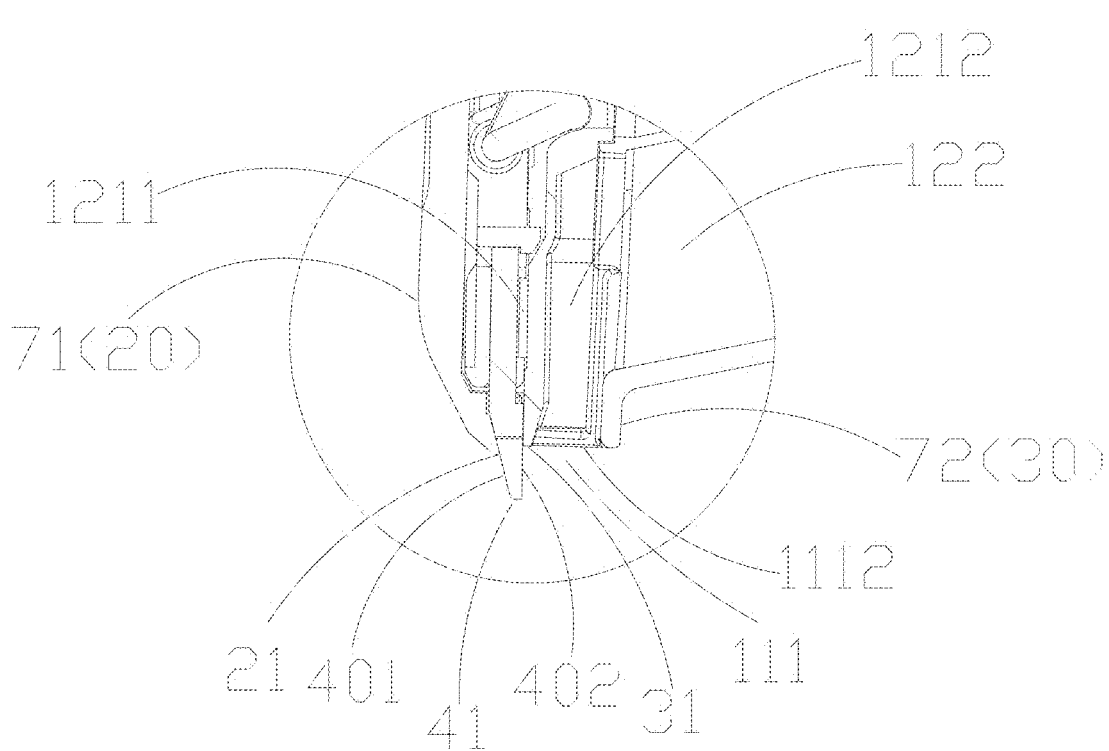

In this embodiment, as shown in FIG. 12, the force driven end 51 of the pressing member 511 is arranged protruding from the second opening 112. Through the arrangement of the above structure, the force driven end 51 of the pressing member 511 protrudes from the second opening 112, which enables easier pressing and controlling of the pressing member 511, so as to conveniently regulate the movement of the row comb 40.

In this embodiment, as shown in FIGS. 11-15, the row comb 40 is parallel to the front scraping plate 20 and the rear scraping plate 30. A distance between a first scraping surface 21 of the front scraping plate 20 and the top end 41 of comb tooth of the row comb 40 is a first distance. The front scraping plate 20 includes the first scraping surface 21. The rear scraping plate 30 includes a second scraping surface 31. The row comb 40 includes the top end 41 of comb tooth. A distance between the second scraping surface 31 of the rear scraping plate 30 and the top end 41 of comb tooth of the row comb 40 is a second distance. The second distance is greater than the first distance. Through the arrangement of the above structure, a difference between the first distance 41 and the second distance 42 is designed, so that the front scraping plate 20 and the rear scraping plate 30 can respectively act on different parts of the row comb 40 during the working process. This design ensures that it is easier for the user to remove pet hair during the combing process, reducing the possibility of hair getting stuck in comb teeth of the row comb 40, and thus improving the hair combing effect.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A hair combing device, comprising:

a brush main body;

wherein the brush main body comprises a front scraping plate, a rear scraping plate and a row comb; a mounting structure is defined in the brush main body; the brush main body is provided with a first opening; the first opening is in communication with the mounting structure; the row comb is arranged at the first opening and at least partially positioned in the mounting structure; the front scraping plate and the rear scraping plate are arranged on a front surface of the row comb and a back surface of the row comb respectively; under the action of external force, the row comb is movable relative to the front scraping plate and the rear scraping plate, and retracts towards an inside of the mounting structure, so that the front scraping plate and the rear scraping plate can simultaneously push a hair on the row comb from a comb tooth gap of the row comb to a top end of a comb tooth of the row comb for removal;

wherein the brush main body further comprises a transmission component arranged in the mounting structure and connected to the row comb; the transmission component comprises a connecting member assembly, a fixing frame, and restoration springs;

the connecting member assembly comprises a first connecting member and a second connecting member hinged with each other, and the second connecting member is configured to drive the row comb;

the fixing frame is arranged on a side edge of the second connecting member and hinged with the first connecting member; the restoration springs are positioned in the fixing frame;

the rear scraping plate is provided with stop parts corresponding to the restoration springs, one end of each of the restoration springs abuts against a corresponding stop part, and an opposite end of each of the restoration springs abuts against the connecting member assembly.

2. The hair combing device according to claim 1, wherein the row comb is capable of being driven to move relative to the front scraping plate and the rear scraping plate by driving the transmission component.

3. The hair combing device according to claim 2, wherein a second opening is defined in a side wall of the brush main body; the second opening is in communication with the mounting structure; the transmission component comprises one force driven end and a connecting end; the connecting end of the transmission component is connected to the row comb; the force driven end of the transmission component is arranged at the second opening; and when an external force acts on the force driven end of the transmission component, the transmission component is configured for driving the row comb to move relative to the front scraping plate and the rear scraping plate.

4. The hair combing device according to claim 3, wherein the connecting member assembly is partially installed on the rear scraping plate; a first end of the connecting member assembly is the connecting end, and a second end of the connecting member assembly is the force driven end; when the force driven end is driven by external force, the connecting member assembly is approached toward the stop parts; and each of the restoration springs is used for restoring the connecting member assembly to an initial position.

5. The hair combing device according to claim 4, wherein the connecting member assembly comprises a first connecting member, a second connecting member and a pressing member; a first end of the second connecting member is the connecting end; the force driven end is arranged on the pressing member; one end of the first connecting member is connected to a second end of the second connecting member; the pressing member is connected to an opposite end of the first connecting member; the pressing member is positioned at the second opening; when the force driven end on the pressing member is pressed, the first connecting member drives the second connecting member, so that the second connecting member drives the row comb to move; and each of the restoration springs is used for restoring the first connecting member, the second connecting member and the row comb to the initial position.

6. The hair combing device according to claim 5, wherein the second connecting member is provided with protrusions corresponding to the restoration springs; one end of each of the restoration springs is connected to a corresponding stop part; and an opposite end of each of the restoration springs is sleeved on a corresponding protrusion.

7. The hair combing device according to claim 6, wherein a side edge of the second connecting member near the first connecting member is provided with the fixing frame; the stop parts and the protrusions are positioned in the fixing frame; and the stop parts are arranged near the first connecting member.

8. The hair combing device according to claim 7, wherein the fixing frame comprises a first fixing frame and a second fixing frame; the first fixing frame and the second fixing frame are both arranged on the side edge of the second connecting member; the first connecting member is arranged between the first fixing frame and the second fixing frame; both the first fixing frame and the second fixing frame are hinged with the first connecting member; the first fixing frame and the second fixing frame are both internally provided with the stop parts, the restoration springs and the protrusions.

9. The hair combing device according to claim 5, wherein a root portion of each comb tooth of the row comb is always positioned in the mounting structure.

10. The hair combing device according to claim 3, wherein the brush main body further comprises a handle and a scraping head; the mounting structure comprises a first mounting cavity and a second mounting cavity; the scraping head is arranged at one end of the handle; the first opening is defined in the scraping head; the first mounting cavity is defined in the scraping head; the second mounting cavity is defined in the handle; the first mounting cavity is in communication with the second mounting cavity; the first mounting cavity is in communication with the first opening; the second mounting cavity is in communication with the second opening; a first part of the transmission component is arranged in the first mounting cavity; a second part of the transmission component is arranged in the second mounting cavity; and the second opening is defined in a side wall of the handle.

11. The hair combing device according to claim 10, wherein the scraping head comprises an upper cover and a lower cover; the lower cover is connected to the handle; the upper cover and the lower cover are capable of being connected to each other; after the upper cover and the lower cover are connected, the first mounting cavity and the first opening are formed.

12. The hair combing device according to claim 10, wherein the brush main body further comprises a mounting plate; the mounting plate is arranged in the first mounting cavity and mounted on the lower cover; the mounting plate divides the first mounting cavity into a first mounting sub-cavity and a ventilation channel, and divides the first opening into a first sub-opening and an air inlet; the first mounting sub-cavity and the ventilation channel are both in communication with the second mounting cavity; the transmission component is partially arranged in the first mounting sub-cavity; the handle is provided with an insertion hole for connecting with a suction port of a dust suction device; the insertion hole is in communication with the second mounting cavity.

13. The hair combing device according to claim 10, wherein the scraping head is arranged at one end of the handle to form an L-shape.

14. The hair combing device according to claim 12, wherein the insertion hole is arranged at a tail end of the handle.

15. The hair combing device according to claim 10, wherein the upper cover comprises a flat surface, a curved surface extending towards the first opening, and a blocking plate; one end of the curved surface is connected to the flat surface; an opposite end of the curved surface is connected to one end of the blocking plate; and an opposite end of the blocking plate is close to the row comb.

16. The hair combing device according to claim 10, wherein the upper cover comprises two side walls, wherein the two side walls are provided with clamping blocks; the lower cover is provided with clamping slots corresponding to the clamping blocks; and the clamping block is inserted into and clamped to the clamping slot.

17. The hair combing device according to claim 16, wherein both the upper cover and the lower cover are also provided with threaded holes; the upper cover is threaded to the lower cover through the threaded holes.

18. The hair combing device according to claim 5, wherein the force driven end of the pressing member is arranged protruding from the second opening.

19. The hair combing device according to claim 1, wherein the row comb is parallel to the front scraping plate and the rear scraping plate; the front scraping plate comprises a first scraping surface; the rear scraping plate comprises a second scraping surface; a distance between the first scraping surface of the front scraping plate and the top ends of the comb teeth of the row comb is a first distance; a distance between the second scraping surface of the rear scraping plate and the top end of comb tooth of the row comb is a second distance; and the second distance is greater than the first distance.

* * * * *